Feb. 7, 1939.   E. A. STIENEN   2,145,957
HOLDER FOR TEXTILES
Filed May 19, 1937
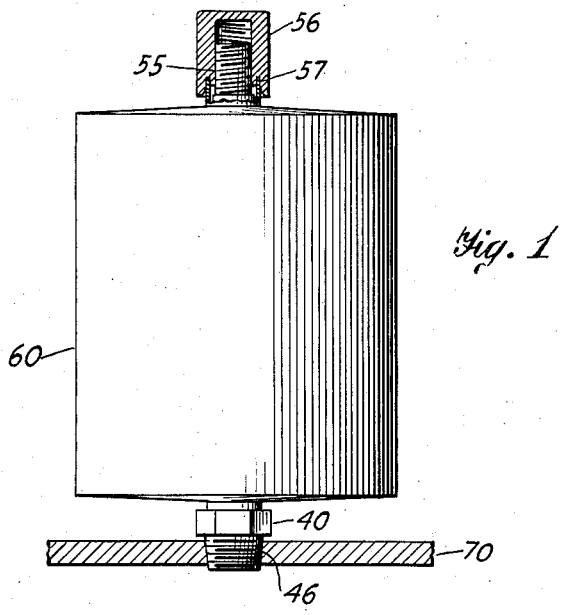
*Fig. 1*
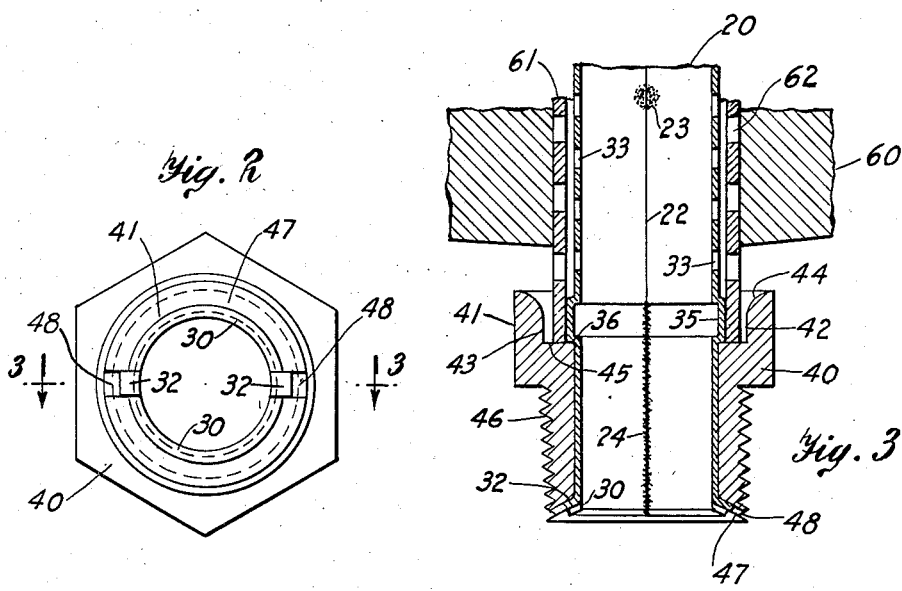
*Fig. 2*
*Fig. 3*
INVENTOR.
ERNEST A. STIENEN
BY A. A. de Bonneville
ATTORNEY.

Patented Feb. 7, 1939

2,145,957

UNITED STATES PATENT OFFICE 2,145,957

HOLDER FOR TEXTILES

Ernest A. Stienen, New York, N. Y.

Application May 19, 1937, Serial No. 143,466

4 Claims. (Cl. 68—198)

This invention relates to holders for textiles.

The object of the invention is the production of a holder for textiles having a supporting tube, which is securely maintained in fixed longitudinal position and in fixed non-rotative position.

The second object of the invention is the production of a holder for textiles, to securely clamp them in place during the operations of dyeing, extracting surplus fluids and drying said textiles.

The third object of the invention is the production of a holder for packages of wound textiles and the like, by means of which the cores of the packages are clamped in fixed longitudinal position and in non-rotative position.

In the accompanying drawing Fig. 1 represents an elevation partly in longitudinal section of one of the holders with its wound textile and carrier; Fig. 2 shows an enlarged bottom view of a portion of Fig. 1 and Fig. 3 indicates a section of Fig. 2 on the line 3, 3.

The holder in this instance comprises the inner cylindrical longitudinal supporting tube indicated in its entirety by the numeral 20. The said tube 20 is shown with the longitudinal seam 22, which at its upper portion is closed by spot welding as indicated at 23, and the lower portion of said seam is securely closed by welding as shown at 24. With the lower end of the tube 20 are formed the pair of inclined oppositely positioned circular flanges 30, and between the adjacent ends of said flanges 30, inclined stop lugs 32 extend from the tube 20. Perforations 33 extend through the wall of the tube 20. In the lower portion of the supporting tube 20 and spaced from its lower end is indicated the bulged out cylindrical supporting portion 35 integral therewith having the flat supporting shoulder 36 at its lower end.

The supporting plug for the holder is indicated in its entirety by the numeral 40. The said plug comprises the hexagonal head 41, which latter has indicated therein at its upper end the cylindrical cavity 42, having the cylindrical wall 43 with the curved upper end 44. The cavity 42 is indicated with the flat seat 45. A threaded sleeve-like shank 46 having the tapered lower face 47 extends from the head 41. Inclined slots 48 extend upwardly from the said lower face 47.

The shoulder 36 of the bulged out supporting portion 35 of the tube 20 bears upon the seat 45, and the flanges 30 bear up against the tapered lower face 47 of the shank 46.

It will be noted that the stop lugs 32 are spaced from the thread of the shank 46 and are seated in the inclined slots 48.

By means of the coaction of the cylindrical supporting portion 35 of the supporting tube 20 with the seat 45 of the plug 40, and the coaction of the flanges 30 of said tube 20 with the tapered lower face 47 of the shank 46, the said tube 20 is securely fixed to the plug 40 in the direction of its longitudinal axis.

The coaction of the stop lugs 32 of the tube 20 with the slots 48 of the plug 40 maintains the tube 20 in non-rotative position.

In the upper end of the supporting tube 20 is fixed a plug having the threaded upper portion 55. A cap 56 with the circular groove 57 at its lower end is in threaded engagement with the threaded portion 55.

A package of a wound textile, in this instance, is indicated at 60, with its core 61, preferably of paper, having the perforations 62.

The core 61 at its lower end extends into the cavity 42 of the plug 40 and bears on the seat 45 of said cavity and the upper end of the core extends into the groove 57 of the cap 56.

The lower portion of the core 61 bears against the outer face of the cylindrical supporting portion 35 of the tube 20.

The threaded shank 46 of the supporting plug 40 is indicated in threaded engagement with the carrier 70.

Various modifications may be made in the invention and the present exemplification is to be taken as illustrative and not limitative thereof.

Having described my invention I claim:

1. In a holder for a textile the combination of a supporting tube having perforations, said tube having a bulged out portion in the lower portion thereof and integral therewith and having a pair of flanges at its lower end and also having a pair of stop lugs adjacent to its lower end, and a supporting plug having a seat for said tube and having a lower face with slots therein, the lower end of said bulged out portion of the tube bearing on the seat of the plug, the flanges of the tube bearing against the lower face of the plug and said stop lugs positioned in the slots of the lower face of the plug.

2. In a holder for a wound textile the combination of a supporting tube having perforations, said tube having a bulged out portion integral therewith, said tube also having a pair of flanges at its lower end and also having a pair of stop lugs adjacent to its lower end disposed between said flanges and a supporting plug for said tube, said plug having a seat at its upper end and having a threaded shank with a tapered lower face with slots therein, the lower end of said bulged out portion of the tube bearing on the seat of the plug and adapted to support the core of a package of textile, the flanges of the tube bearing against the lower face of the plug and said stop lugs positioned in the slots of the lower face of the plug.

3. In a holder for a package of wound textile having a perforated core, the combination of a supporting tube having perforations, extending through the core of the package, said tube having a bulged out portion in its lower portion spaced from its lower end, said bulged out portion having a flat supporting shoulder at its lower end, said tube having a pair of oppositely positioned circular flanges at its lower end and also having a pair of stop lugs at its lower end disposed between its flanges and a supporting plug for said supporting tube, said plug having a cylindrical cavity at its upper end, said cavity having a flat seat, said plug also having a threaded shank extending downwardly from its upper portion, said shank having a tapered lower face with slots therein, said flat supporting shoulder of the tube bearing on the seat of the plug and the flanges of the tube bearing against the tapered lower face of said shank to lock the tube in the direction of its longitudinal axis, and the stop lugs of the tube seated in the slots of the tapered lower face of the shank, to maintain the tube in non-rotative position, the core of the package extending into the cavity of the plug with its lower end bearing on the seat of the plug.

4. In a holder for a package of a textile having a perforated core, the combination of a supporting tube, said tube having a bulged out portion integral therewith, a supporting plug for the tube, said plug having a cylindrical cavity at its upper end with a flat seat, the said bulged out portion of the supporting tube bearing against the flat seat of the supporting plug, means to clamp said tube against the lower face of the plug coacting with said bulged out portion to clamp said tube in the direction of its longitudinal axis and means at the lower end of the tube coacting with means at the lower end of the plug to maintain said tube in fixed non-rotative position, the core of said package at its lower end bearing against the bulged out portion of the tube to maintain it in fixed position.

ERNEST A. STIENEN.